(12) United States Patent
Berke

(10) Patent No.: US 7,115,857 B1
(45) Date of Patent: Oct. 3, 2006

(54) APPARATUS FOR REMOTELY COUNTING OBJECTS IN A COLLECTION USING DIFFERENTIAL LIGHTING

(75) Inventor: Anthony Joseph Berke, Exeter, NH (US)

(73) Assignee: River City Software LLC, Exeter, NH (US)

( * ) Notice: Subject to any disclaimer, the term of this patent is extended or adjusted under 35 U.S.C. 154(b) by 0 days.

(21) Appl. No.: 11/167,321

(22) Filed: Jun. 27, 2005

(51) Int. Cl.
*H01J 40/14* (2006.01)
*G06M 7/00* (2006.01)

(52) U.S. Cl. .................... 250/222.1; 377/8; 702/128

(58) Field of Classification Search .......... 250/222.1, 250/559.04, 559.05, 559.07, 559.08, 559.12, 250/559.25; 377/6, 8; 702/128
See application file for complete search history.

(56) References Cited

U.S. PATENT DOCUMENTS

| | | | | |
|---|---|---|---|---|
| 4,373,135 | A * | 2/1983 | Mohan et al. | 377/8 |
| 5,040,196 | A * | 8/1991 | Woodward | 377/8 |
| 5,307,294 | A * | 4/1994 | Aman et al. | 702/128 |
| 6,177,682 | B1 * | 1/2001 | Bartulovic et al. | 250/559.44 |
| 6,531,693 | B1 * | 3/2003 | Focke et al. | 250/221 |

\* cited by examiner

*Primary Examiner*—Thanh X. Luu

(57) ABSTRACT

Apparatus for remotely counting the number of individual objects of the same general shape and disposed in a collection having a front end in a common vertical plane.

5 Claims, 5 Drawing Sheets

APPARATUS FOR REMOTELY COUNTING OBJECTS IN A COLLECTION USING DIFFERENTIAL LIGHTING

FIELD OF THE INVENTION

This invention is directed toward apparatus for remotely counting the number of individual objects of the same general shape and disposed in a collection in a common plane.

BACKGROUND OF THE INVENTION

It is often necessary to count the number of individual objects such as bricks, bags of cement or other like objects which are disposed in a collection of these objects in a common plane. While such counts may be obtained by having one or more individuals to stand adjacent to the plane, but inclement weather conditions or other factors may require such counts to be made in positions remote to this plane.

The present invention provides new and improved apparatus for performing such remotely disposed counting operations.

SUMMARY OF THE INVENTION

In accordance with the principles of this invention, apparatus for remotely counting the number of individual objects having the same general shape and disposed in a collection having a front end disposed in a common vertical plane, employs the following components.

A plurality of elements for producing light beams are used. Each element when actuated emits a focused beam of light for s short predetermined interval.

A camera is disposed remotely from the plane with the camera image oriented at right angles to the plane so that the camera can record and store images of the plane as the plane is successively exposed to a plurality of successive light beams of short duration directed thereto. The camera is synchronized to record images only in the presence of the beams:

At least two said individual beams are directed successively upon the plane and are actuated successively so that only one beam at a time impinges upon the plane. These elements are caused to strike the plane at different oblique angles to produce a plurality of successive images stored in the camera wherein the objects in all stored images are always in like congruent positions and shadows are created in the various stored images because of the oblique angles of the beams striking the plane. When two elements are used, they are directed upon the left and right side of the plane. When inspecting the images from the left to the right, the shadows flow toward the right and left sides of the plane.

When the number of beams used is increased to four, the two additional beams are directed upon the top and bottom of the plane, producing additional shadows which when the images are inspected from top to bottom, the shadows flow toward the top, bottom, left side and right side edges of the plane.

The camera is programmed to define a peripheral bounding area for the stored images to enable the objects in the collection to be distinguished and separated from undesired background shadows. The first beam is directed at the right edge of the collection. The shadows produced by the first beam are identified by dark to light transitions. The second element is directed at the left edge of the collection. The shadows produced by the second are identified by light to dark transitions.

The third beam is directed at the bottom edge of the collection. The shadows produced by the third beam are identified by light to dark transitions. The fourth beam is directed at the top edge of the collection. The shadows produced by the fourth element are identified by dark to light transitions.

The user can process the various stored images as for example by visually processing and combining them to compute the desired number of remotely disposed individual objects in the collection.

These and other objects and advantages of this invention will either be explained or will become apparent upon review of the detailed description and drawings which follow.

DETAILED DESCRIPTION OF PREFERRED EMBODIMENTS

Figure 1:
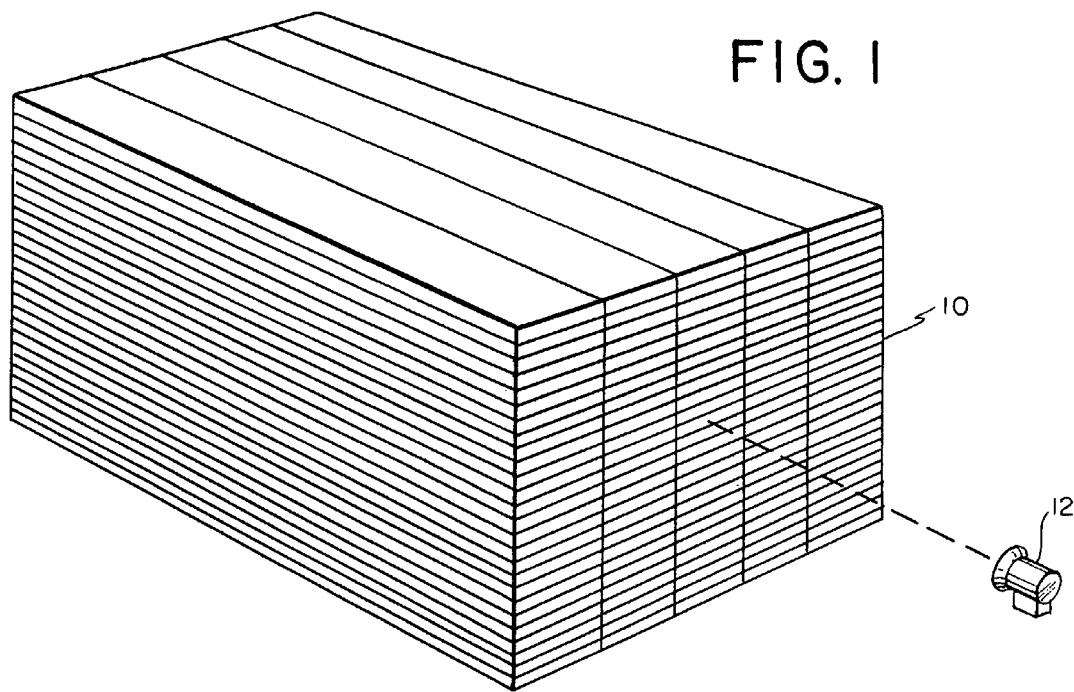
FIG. 1 is a view of the collection of objects in a vertical plane.
Figure 2:
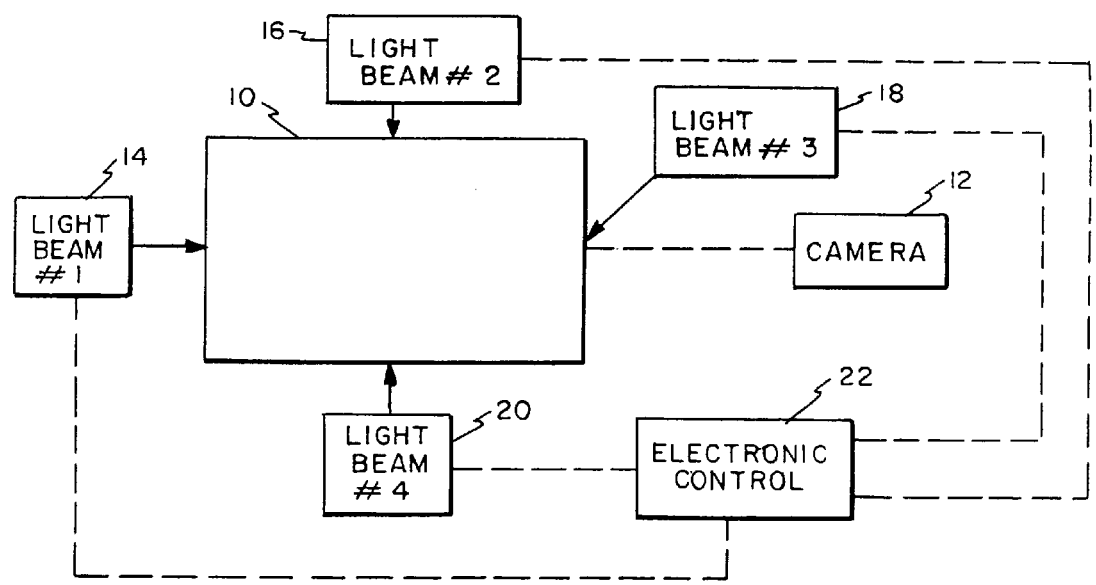
FIG. 2 illustrates the apparatus in position for use.
Figure 3:
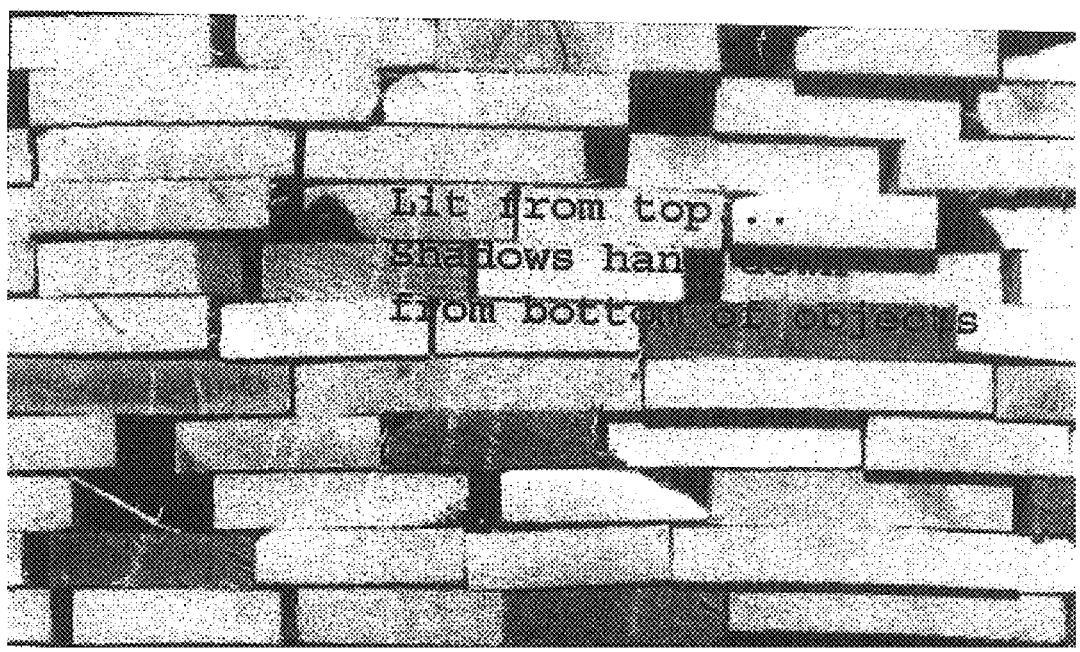
FIG. 3 is a view of the image recorded when the collection is illuminated by directing a light beam from the top downward to the bottom thereof.
Figure 4:
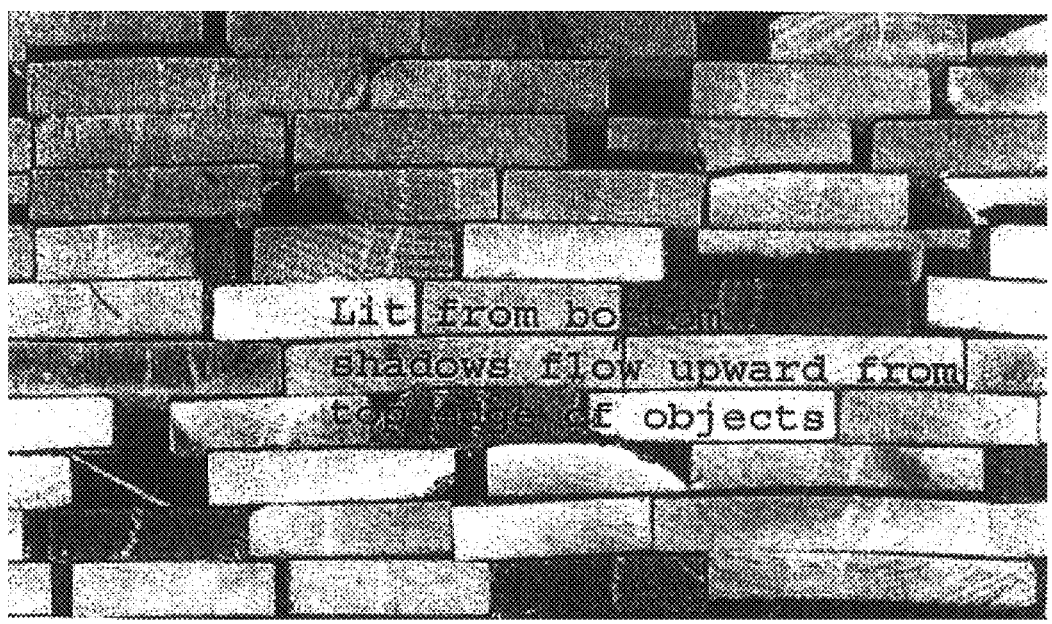
FIG. 4 is a view of the image recorded when the collection is illuminated by directing a light beam from its bottom upward to its top thereof.
Figure 5:
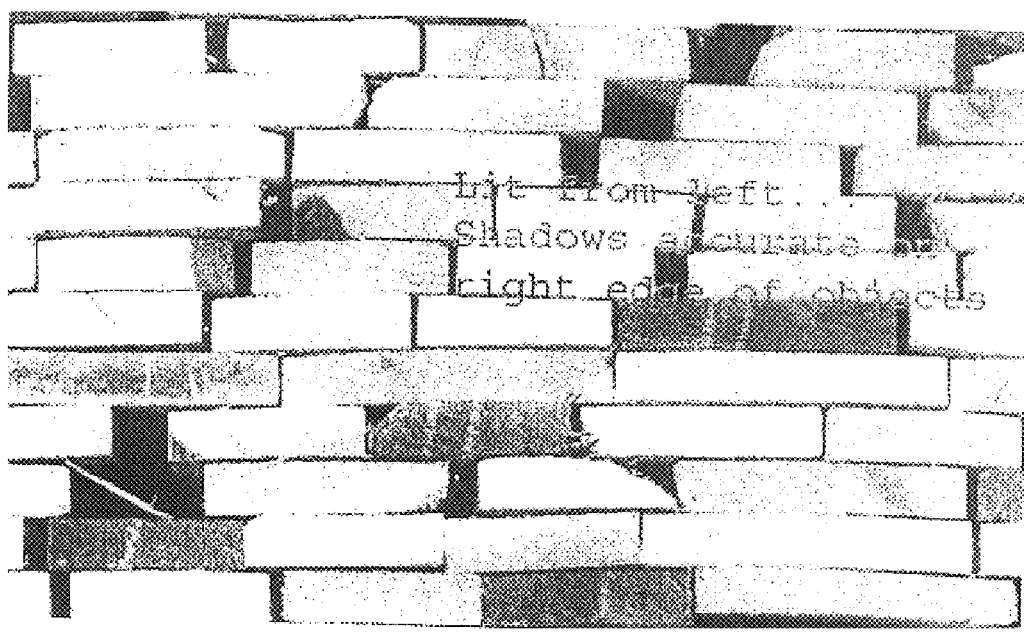
FIG. 5 is a view of the image recorded when the collection is illuminated by directing a light beam from its left side toward its right side thereof.
Figure 6:
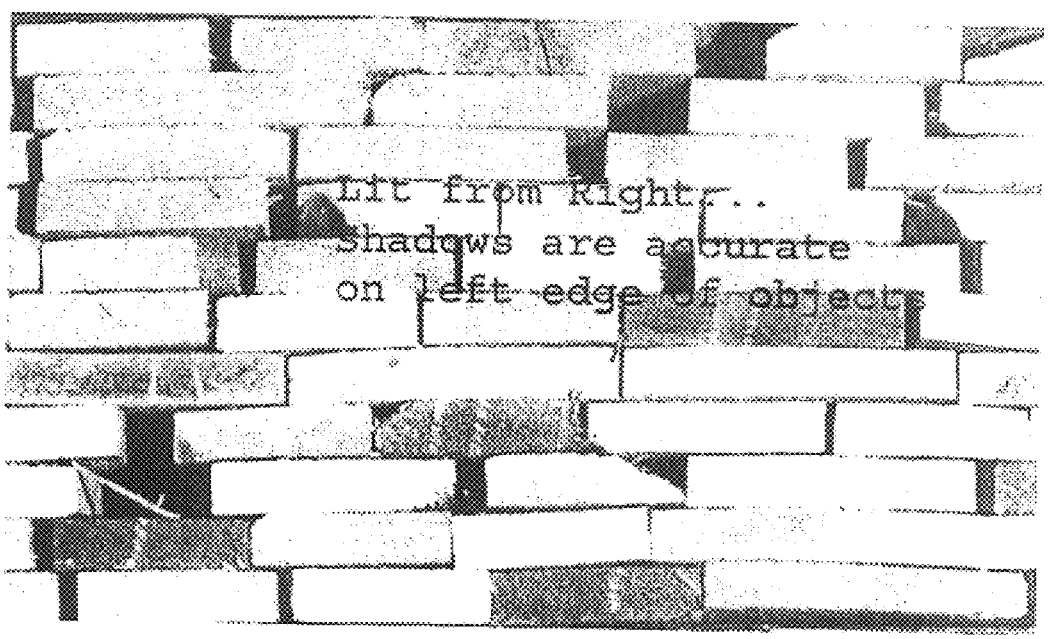
FIG. 6 is a view of the image recorded when the collection is illuminated by directing a light beam from its right side toward its left side thereof.

Referring now to FIGS. 1–6, there is shown apparatus for remotely counting the number of individual objects having the same general shape and disposed in a collection having a front end disposed in a common vertical plane.

This apparatus includes the collection 10, and a camera 12 disposed remotely from the vertical plane of the front end of the collection and oriented with the camera image at right angles to the plane. The camera has the function of recording and storing images of the vertical plane as the plane is successively exposed to a plurality of successive light beams of short duration directed thereto, the camera being synchronized to record only in the presence of said beams.

The apparatus also includes first, second, third and fourth elements for producing light beams 14, 16, 18 and 20.

At least two of said individual beams for example beams 14 and 16, are aimed and directed at the plane. Electronic device of known type 22 connected to these elements causes these beams to be actuated and deactuated in sequence. These elements are positioned to strike the plane at different oblique angles at its left and right sides, in order to produce a plurality of successive images which are stored in the camera. When these successive images are viewed by a user, it will be seem that the objects in all stored images are always in like congruent positions and different shadows are created in the various stored images because of the oblique angles of the beams striking the plane. When inspecting the images from the left to the right, these shadows flow toward the left side and right side edges of the plane.

When the two additional beams 18 and 20 are positioned to strike the plane at different oblique angles at the top and bottom of the plane are operated together with elements 14, and device 22 causes all these elements to be actuated and deactuated in sequence, additional images are produced and additional shadows are produced. When the images are inspected from top to bottom, the shadows flow toward the top and bottom of the plane.

The camera can be programmed to define a peripheral bonding area for the stored images to enable the objects in the collection to be distinguished and separated from undesired background shadows A user can visually or electronically combine these images containing the objects and shadows in such manner as to remotely count the number of individual objects in the collection.

While the invention has been described with particular reference to the drawings and detailed description, the protection solicited is to be limited only by the terms of the claims which follow.

What is claimed is:

1. Apparatus for remotely counting the number of individual objects having the same general shape and disposed in a collection having a front end disposed in a common vertical plane, said apparatus comprising:
   a plurality of at least two elements for producing beams of light, each element when actuated and then deactuated emits a focused light beam for a short predetermined interval;
   a first element being disposed adjacent the left edge of the plane and oriented when actuated to produce a beam which strikes the plane at an oblique angle;
   a second element being disposed adjacent the right edge of the plane and oriented when actuated to produce a beam which strikes the plane at an oblique angle;
   a device connected to all of said elements for programmed for selecting, actuating and deactuating elements sequentially so that only one beam at a time can strike the plane;
   a camera disposed remotely from the plane with the camera image oriented at right angles to the plane so that the camera can record and store images of the plane as the plane is successively exposed to a plurality of successive light beams of short duration directed thereto, the camera being synchronized to record only in the presence of said beams;
   said device actuating and deactuating said first and second elements in sequence to strike the plane to produce a plurality of successive images stored in the camera in which the objects in all stored images are always in like congruent positions and shadows are created in the various stored images because of the oblique angles of the beams striking the plane, said shadows flowing toward the left side and right side edges of the plane, the images and shadows being utilized in said remote counting.

2. Apparatus for remotely counting the number of individual objects having the same general shape and disposed in a collection having a front end disposed in a common vertical plane, said apparatus comprising:
   a plurality of at least two light beam producing elements, each element when actuated and then deactuated emits a focused light beam for a short predetermined interval;
   a first element being disposed adjacent the top edge of the plane and oriented when actuated to produce a beam which strikes the plane at an oblique angle;
   a second element being disposed adjacent the bottom edge of the plane and oriented when actuated to produce a beam which strikes the plane at an oblique angle;
   a device connected to all of said elements for programmed for selecting, actuating and deactuating elements sequentially so that only one beam at a time can strike the plane;
   a camera disposed remotely from the plane with the camera image oriented at right angles thereto to record and store images of the plane as the plane is successively exposed to a plurality of successive light beams of short duration directed thereto, the camera being synchronized to record only in the presence of said beams;
   said device actuating and deactuating said first and second elements in sequence to strike the plane to produce a plurality of successive images stored in the camera in which the objects in all stored images are always in like congruent positions and shadows are created in the various stored images because of the oblique angles of the beams striking the plane, said shadows flowing toward top and bottom edges of the plane, the images and shadows being utilized in said remote counting.

3. Apparatus for remotely counting the number of individual objects having the same general shape and disposed in a collection having a front end in a common vertical plane, said apparatus comprising:
   four light beam producing elements, each element when actuated and then deactuated emits a focused light beam for a short predetermined interval;
   the first element being disposed adjacent the left edge of the plane and oriented when actuated to produce a beam to strike the plane at an oblique angle;
   the second element being disposed adjacent the right edge of the plane and oriented when actuated to produce a beam to strike the plane at an oblique angle;
   the third element being disposed adjacent the top edge of the plane and oriented when actuated to produce a beam to strike the plane at an oblique angle;
   the fourth element being disposed adjacent the bottom edge of the plane and oriented when actuated to produce a beam to strike the plane at an oblique angle;
   a device connected to all of said elements for programmed for selecting, actuating and deactuating elements sequentially so that only one beam at a time can strike the plane;
   a camera disposed remotely from the plane with the camera image oriented at right angles thereto to record and store images of the plane as the plane is successively exposed to a plurality of successive light beams of short duration directed thereto, the camera being synchronized to record only in the presence of said beams;
   said device actuating and deactuating said first, second, third and fourth elements in sequence to strike the plane to produce a plurality of successive images stored in the camera in which the objects in all stored images are always in like congruent positions and shadows are created in the various stored images because of the oblique angles of the beams striking the plane, said shadows flowing toward the left side and right side edges and top and bottom edges of the plane, the images and shadows being utilized in said remote counting.

4. The apparatus of claim 1 wherein the first element is directed at the right edge of the collection, the shadows being identified by dark to light transitions and the second element is directed at the left edge of the collection, the shadows being identified by light to dark transitions.

5. The apparatus of claim 2 wherein the first element is directed at the bottom edge of the collection, the shadows being identified by light to dark transitions, the second element being directed at the top edge of the collection, the shadows being identified by dark to light transitions.

* * * * *